FLUX-DOUBLING IN MAGNETIC CORES

Filed June 8, 1960 3 Sheets-Sheet 1

DAVID R. BENNION
DOUGLAS C. ENGELBART
EDWIN K. VAN DE RIET
*INVENTORS.*

BY Lyon & Lyon
ATTORNEYS.

DAVID R. BENNION
DOUGLAS C. ENGELBART
EDWIN K. VAN DE RIET
*INVENTORS.*

BY Lyon & Lyon
ATTORNEYS.

FLUX-DOUBLING IN MAGNETIC CORES

Filed June 8, 1960 3 Sheets-Sheet 3

DAVID R. BENNION
DOUGLAS C. ENGELBART
EDWIN K. VAN DE RIET
*INVENTORS.*

BY Lyon & Lyon
ATTORNEYS.

3,009,136

FLUX-DOUBLING IN MAGNETIC CORES

David R. Bennion, Loma Mar, and Douglas C. Engelbart and Edwin K. Van De Riet, Palo Alto, Calif., assignors to Stanford Research Institute, Palo Alto, Calif., a corporation of California Filed June 8, 1960, Ser. No. 34,678
7 Claims. (Cl. 340—174)

This invention relates to magnetic-core storage systems and, more particularly, to improvements therein.

Storage systems, such as shift registers which employ only magnetic elements and wire, are known and widely used in the fields wherein electronic equipment is employed for processing data. One of the problems which confronts a designer of a shift register is that in the course of the propagation of data through a shift register made of magnetic elements and wire, losses occur which can prevent the stable operation of a shift register.

An object of the present invention is to provide an improved magnetic-core flux-gain coupling scheme for a shift register whereby stable operation is more readily achieved.

Yet another object of the present invention is the provision of a simple arrangement for coupling magnetic cores whereby flux gain is achieved in the transfer between the coupled cores.

Still another object of the present invention is to provide a novel and useful coupling scheme between magnetic cores.

These and other objects of the present invention are achieved in an arrangement which utilizes three magnetic cores. These are interconnected in a manner so that when two of these cores are driven from their clear to their set state, the third core can store the input flux from these and is thereby placed in its set state, also. Thereafter, when the third core is cleared, it can transfer twice as much flux into the first two cores of the succeeding magnetic-core array as was received by the first two cores in the first array for effectuating the data transfer.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURES 1 through 4 each show the embodiment of the invention with only a part of the required windings. The purpose in showing the required windings for the invention in this manner is to simplify the presentation in the drawings and the explanation of the operation of the invention;

The magnetic cores which are employed in the embodiment of the invention to be described preferably may have a toroidal shape. The material of which the cores are made can be either metal or ceramic material, and it has a substantially rectangular hysteresis characteristic. With such a characteristic, a core will have two stable states of magnetic saturation. One of these will be referred to hereafter as the "clear state," and in that state represents a binary "zero." The other stable state of the core will be referred to hereafter as the "set state," and in that state represents a binary "one."

Figures 1, 2, 3, 4:
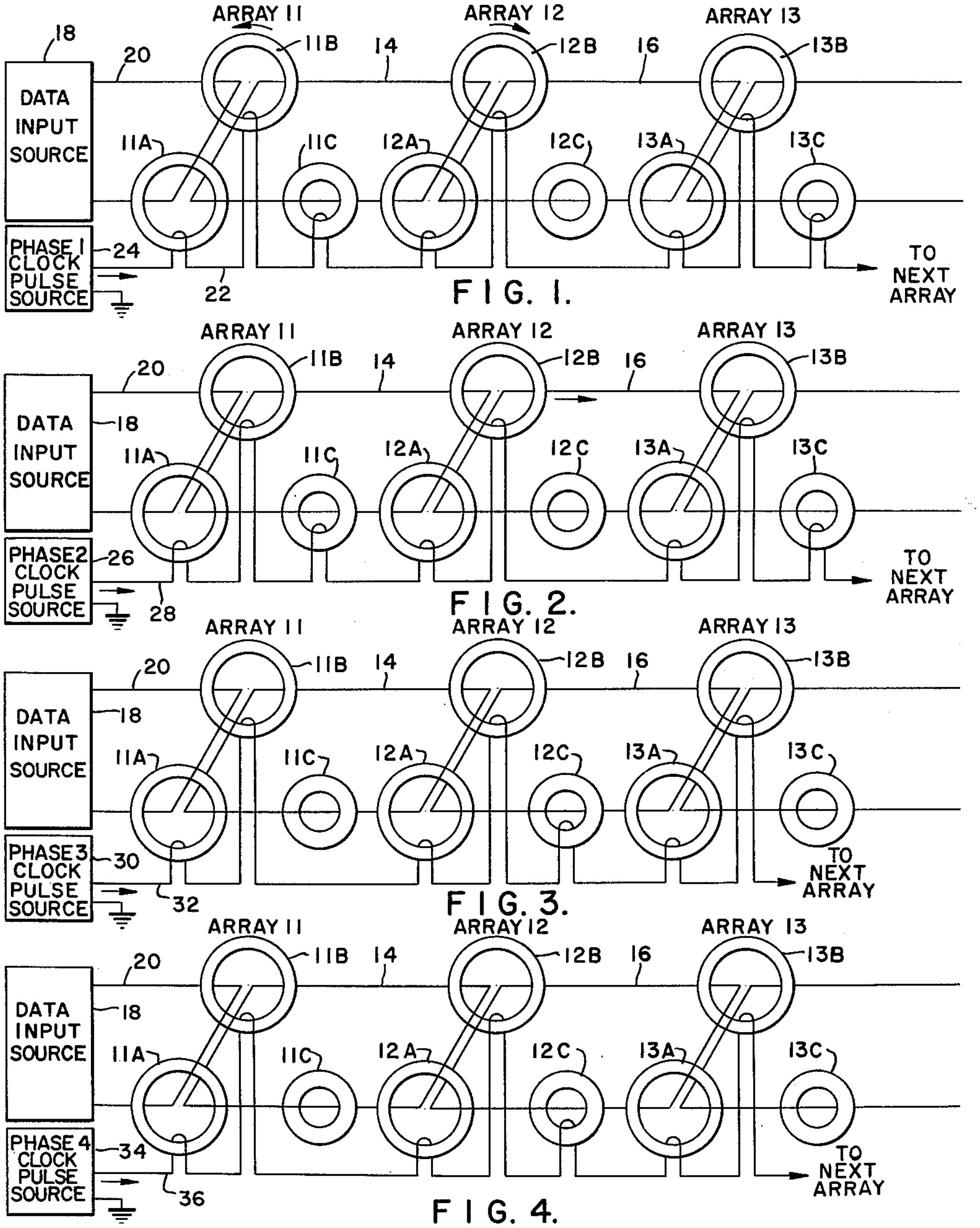

Referring now to FIGURE 1, there may be seen a circuit diagram showing an arrangement of cores in accordance with this invention with some of the windings required. It will be noted that for the storage of each binary bit of information three cores are required. Each set of three cores is designated as an array, and, thus, as shown in FIGURE 1, there are three arrays, respectively designated as array 11, array 12, and array 13. These three arrays are shown by way of example, since, as will become apparent from the description of the invention that follows, it will be seen that it is possible to extend a register to have as many arrays as are desired.

Array 11 includes an input core 11A, a main core 11B, and an output core 11C. Array 12 includes an input core 12A, a main core 12B, and an output core 12C. Array 13 includes an input core 13A, a main core 13B, and an output core 13C. There is a transfer winding 14 which couples the cores of array 11 to array 12 for the purpose of transferring data therebetween. Another transfer winding 16 couples the cores of array 12 to array 13 for data transfer also. Transfer winding 14 passes up through core 11B, then up through core 11A, then down through core 11C, up through core 12A, then down through core 12B, and back to close the transfer-winding loop at core 11B. Considering the cores in the plane of the drawing, then, when the winding is designated as coming up through a core, it refers to the winding passing from the side of the plane furtherest away from the observer to the side closest to the observer.

Transfer winding 16 is coupled to cores 12B, 12A, 12C, 13A, and 13B with the same respective winding senses as have been described for the coupling of winding 14 to the cores 11A, 11B, 11C, 12A, 12B, to which it is coupled. Input to the register is received from a data-input source 18, which is coupled by an input winding 20 to input cores 11A and main core 11B. One other winding shown in FIGURE 1 is a first drive winding 22, which is driven from a phase-1 clock-pulse source 24. This drive winding 22 is coupled to all the cores in array 11, then to cores 12A and 12B in array 12. The drive winding 22 would thereafter be extended to couple in a manner similar to that shown for arrays 11 and 12 to all the cores in array 13 and then to the input and main cores of an array following array 13. This odd-even coupling pattern can be continued until the end of the register. The manner of coupling the drive winding 22 is, as shown in FIGURE 1, up through input core 11A, up through main core 11B, down through output core 11C, down through input core 12A, up through main core 12B, up through input core 13A, up through main core 13B, down through output core 13C, and then to the succeeding arrays following array 13 with the same coupling sense which has just been recited.

One other requirement, in order to achieve the proper operation of the embodiment of the invention, concerns itself with the cores which are employed. It was previously stated that these cores must have a substantially rectangular hysteresis characteristic. It is known that in order to drive one of these cores from one of its states of stable remanence to the other, it is necessary to exceed a certain threshold value with the driving magnetomotive force. Otherwise, the cores are not transferred or switched. Thus, in each one of the arrays, it is requisite that the threshold magnetomotive force of the input core be substantially the same as that of the main core to prevent switching of the input core during a data transfer to a succeeding array. This may readily be done by making these input and main cores of the same size. Further, the output core must be capable of receiving and storing twice as many flux linkages as either the input or main cores.

With the windings as shown in the drawings, it will be assumed that when a core is in its clear state, its flux linkages circulate through the core in a clockwise direction. When a core is said to be in its "one" state, or set state, its flux linkages will be assumed to circulate through the core in a counterclockwise direction. An array which is storing a "one" will have all three of its cores saturated with their flux linkages circulating in a counterclockwise direction.

Assume, now, that the data-input source 18 has applied a current to the input winding 20 which has resulted in cores A, B, and C (via the transfer winding 14 having a sufficient voltage induced therein as a result of driving cores A and B) to place these three cores in their set state. All the other cores of the arrays are in their clear (saturated in the clockwise direction) state. It is desired to transfer the "one" stored in array 11 to array 12. The phase-1 clock-pulse source provides a pulse of current to the drive winding 22. This does not affect the state of remanence of core 11A, whether core 11A is in a set or clear state, since the magnetomotive force developed therein, in response to this current pulse, is fixed at a value less than the threshold magnetomotive force of core 11A. A similar statement can be made for core 11B. However, core 11C, the output core, is driven from its set state to its clear state. The current flowing through the drive winding 22 threading through core 11C sets up a clockwise magnetomotive force, whereby this drive is effectuated.

As a result of the transfer of core 11C from its set to its clear state, a voltage is induced in the transfer winding 14. This causes a current flow which, in view of the sense of the coupling of the transfer winding to magnetic cores 11A and 11B, tends to drive these cores to their clear state. However, the drive applied through drive winding 22 maintains these cores in their set states. Similarly, the induced current flowing through transfer winding 14 tends to maintain core 12A in its clear state and to drive core 12B toward its set state. Core 12B is driven to its set state by the addition of the magnetomotive forces obtained from the current flowing through transfer winding 14 and through drive winding 22.

It should be noted at this time that the value of the drive winding 22 ampere turns is such that it will not exceed the value required to drive a main core from one state of magnetic remanence to the other, but it is sufficient to drive an output core from one state of magnetic remanence to the other.

The results of the application of the phase-1 clock pulse are that core 11C is driven to its clear state and core 12B is driven to its set state. When core 12B is driven to its set state, a voltage is induced in the transfer winding 16, causing current flow therein. This current flow results in a half-drive of the sense of the coupling of the transfer winding 16 to cores 12A and 13A, these cores are not affected by the flow of current, since it tends to drive them toward their clear states. Core 13B is not affected by this flow of current, since the threshold thereof is set at a much higher value than the threshold of core 12C.

Reference is now made to FIGURE 2 of the drawings where there may be seen the three arrays 11, 12, and 13, with the associated transfer windings 14 and 16. The difference between FIGURES 1 and 2 is that in FIGURE 2 there is shown a phase-2 clock-pulse source which applies a pulse of current to a second drive winding 28 after the pulse of current from the pulse-1 clock-pulse source 24 has died down. The second drive winding is coupled to cores 11A, 11B, and 11C in the same sense, passing down through the cores. It then is coupled to cores 12A and 12B in a sense opposite to the coupling to cores 11A, 11B, and 11C. Thereafter, the winding 28 is coupled to array 13 and to a succeeding array using the same coupling pattern as is demonstrated for arrays 11 and 12. The coupling pattern for winding 28 to the remainder of the register should now become clear. It is coupled to each two adjacent arrays in the manner shown for arrays 11 and 12.

The application of a current pulse from the phase-2 clock-pulse source 26 to the drive winding 28 establishes a magnetomotive force in cores 11A, 11B, and 11C, which tends to establish the flux in these cores in a clockwise or clear direction, and tends to establish the flux in the cores 12A and 12B in a counterclockwise or set direction. Cores 11A and 11B are cleared by the magnetomotive forces received from the drive winding 28. Core 11C has been previously cleared and thus is left unaffected. Core 12B has been previously driven to its set state, and thus remains unaffected. The switching of cores 11A and 11B from their set to their clear states induces a voltage in transfer winding 14, which causes a current flow therein. The direction of this current flow through the transfer winding 14 is such as to apply a magnetomotive force to core 12A to tend to drive it to a set direction. This is aided by the drive-winding current in the winding 28, and thus core 12A is driven to its set state. The direction of this current flow tends to drive cores 11C and 12B toward their clear states. Since core 11C is already in its clear state, this drive has no effect thereon. As for core 12B, in view of the presence of a drive on the drive winding 28 tending to keep core 12B in its set state, the drive received from the transfer winding 14 does not affect it.

When core 12A is switched, a voltage is induced in transfer winding 16. This causes a current flow through core 12C in a direction to drive it further toward its set state. In view of the drive received previously as a result of the operation occurring in response to the application of the phase-1 clock pulse, core 12C is already half driven, and thus is driven completely to its set state at this time. The direction of current flow in response to the induced voltage in transfer winding 16 also tends to drive core 12B toward its clear state. However, the drive-winding current prevents this from occurring. The drive is applied to core 13B to attempt to drive it toward its set state. However, the threshold value of this core is so high that it remains substantially unaffected. Core 13A receives a drive toward its clear state. Since it is already in the clear state, it remains unaffected. As a result of the phase-2 clock-pulse drive, a transfer is completely effectuated from array 11 to array 12. Cores 11A, 11B, and 11C are now in their clear state, and cores 12A, 12B, and 12C are now in their set states.

Reference is now made to FIGURE 3 of the drawings, which is identical with FIGURES 1 and 2 of the drawings, except for the omission of the phase-1 and phase-2 clock-pulse sources and their associated drive windings. In their place there is shown a phase-3 clock-pulse source 30 and a third drive winding 32. This drive winding passes down through core 11A, up through core 11B, and then is coupled to the cores of arrays 12 and 13 with a coupling sense similar to the manner of coupling the first drive winding 22 to the cores of the arrays 11 and 12. Thus, upon the application of a current pulse from the phase-3 clock-pulse source to the drive winding 32, a drive is applied to core 11A to try to drive it to its clear state, to core 11B to try to drive it to its set state, to core 12A to try to drive it to its set state, to core 12B to try to drive it to its set state, to core 12C to try to drive it toward its clear state, to core 13A to try to drive it toward its clear state, and to core 13B to try to drive it toward its set state.

In response to such drive, cores 11A and 11B remain unaffected, core 12C is driven to its clear state, inducing a voltage in transfer winding 16, as a result of which there is a current flow therein. The current flow in transfer winding 16 applies a magnetomotive force to core 13B, which, combined with the magnetomotive force resulting from the drive on winding 32, causes core 13B to be driven to its set state. Core 13A receives drives from the transfer winding and the drive winding, both of which tend to drive it toward its clear state, and thus is left unaffected. Core 12B is left unaffected in its set state, since the drive from the transfer winding 16 is nullified by the drive from the drive winding 32. Similarly, core 12A remains in its set state, since the drive from the transfer winding is nullified by the drive in the advance winding. Thus, in response to the phase-3 clock-pulse source, core 12C has been cleared, and the main core 13B is in its set condition.

Attention is now directed to FIGURE 4, which is identical with the previous figures except that the clock-pulse sources and drive windings previously shown are omitted and in their place a phase-4 clock-pulse source 34 is shown for the purpose of driving or applying a current to a fourth drive winding 36. This drive winding passes up through core 11A and up through core 11B, and then is coupled to arrays 12 and 13 in the same manner as drive winding 28 is coupled to arrays 11 and 12. Thus, drive winding 36 is coupled to cores 12A, 12B, and 12C with the same winding sense so that upon excitation of the drive winding these cores will be driven toward their clear states. The winding 36 is also coupled to cores 11A, 11B, 13A, and 13B with an opposite-winding sense, so that upon excitation these cores will be driven toward their set states.

Now, assuming excitation of the drive winding 36 from the phase-4 clock-pulse source, cores 12A and 12B will be driven toward their clear states from their set states. This induces a voltage in transfer winding 16, in response to which a current will flow therein. The direction of this current tends to drive core 13A to its set state. The additional drive required to cause core 13A to be driven to its set state is derived from the drive winding 36, which at this time is excited by the phase-4 clock-pulse of current. Core 12C, which was previously cleared, remains cleared, since both the induced current and the drive current tend to drive this core toward its clear state. Core 13B remains in its set state, since the magnetomotive force provided by the induced current is opposed and nullified by the magnetomotive force provided by the current in the drive winding 36. The effects of the transfer of core 13A from its clear to its set state on the output core 13C and any succeeding arrays are identical with that described when core 12A was driven from its clear to its set state. This causes the output core of an array with which the driven input core is associated to be driven to its set state. Thus, at the termination of the phase-4 clock pulse, cores 13A, 13B, and 13C are in their set states and cores 12A, 12B, and 12C are in their clear states.

The amount of flux linkages involved in the transfers will now be examined to show more clearly the flux-doubling action provided by this invention. It should be noted here that the reason for requiring gain in the transfer operation is to make up for the losses involved. When the gain is larger than the losses, the flux builds up until there is a limiting action due to the flux capacity of the elements employed. Assuming, for the sake of explanation, that there are no losses in the transfer of flux between cores, the flux linkages in core 11C, the output core, are transferred to core 12B, the main core, during the phase-1 clock pulse. The flux linkages in cores 11A and 11B are transferred to core 12A, the input core, during the phase-2 clock pulse. Since core 12C receives the flux linkage from core 12B when it is driven from its clear toward its set state during the phase-1 clock pulse, and from core 12A when it is driven to its set state during the phase-2 clock pulse, core 12C has twice the flux linkages that core 11C previously had. Thus, there is present twice the flux linkages to transfer from the output core of array 13 than was present in the transfer from array 11 to array 12. It will be recalled that the transfer is effectuated when the output core is driven from its set to its clear state, in response to which the succeeding main core is driven from its clear to its set state. In view of the arrangement described, since one core which is employed to drive the succeeding core receives the flux input from two preceding cores prior to the drive, which two preceding cores can of themselves provide as much flux as is required to drive the succeeding core, this invention provides an arrangement whereby, unless the losses occurring in a transfer total up to half the flux available for transfer (a most unusual situation which can be readily avoided), a transfer arrangement is provided which enables registers to be built which are extremely stable.

There has been described herein thus far how the invention operates for the transfer of a one. There follows the description of how the invention operates for transfer of a zero. It will be recalled that this is represented by the cores being in their clear states. In FIGURE 1, assume that the phase-1 clock-pulse source applies a current pulse to the drive winding 22. In view of the drive-winding coupling, this tends to drive cores 11A and 11B toward their set states, core 11C to its clear state, core 12A to its clear state, and core 12B to its set state. Since cores 11C and 12A are already in their clear states, the phase-1 clock-pulse drive does not affect these cores. Cores 11A, 11B, and 12B have a threshold value sufficiently high so that it is not exceeded by the phase-1 clock-pulse current alone. Since there is no induced voltage in the transfer winding 16, by reason of cores 12A and 12B not being switched, core 12C remains in its clear state.

Upon the application of a phase-2 clock pulse, the drive resulting upon cores 11A, 11B, and 11C tends to drive them to their clear state, in which they already are. The phase-2 clock-pulse source drive also tends to drive cores 12A and 12B to their set states. However, since the phase-2 clock-pulse drive does not exceed the threshold value for these cores, they remain in their clear states. Since no cores are driven at this time, there are no voltages induced in the transfer windings, and thus all cores remain in their clear state.

Referring now to FIGURE 3, when a phase-3 clock-pulse source occurs, the drive is applied to cores 11B, 12A, and 12B toward the set direction. This drive does not exceed the threshold value for these cores, and therefore they remain clear. The drive to cores 12C and 13A is in a clear direction, and therefore these cores remain clear. The drive to core 13B is in a set direction, but, in view of the fact that the threshold for this core is not exceeded, core 13B remains clear. Thus, when array 12 is in its clear state, the occurrence of the phase-3 clock-pulse has no effect on array 13.

When the phase-4 clock-pulse occurs, as shown in FIGURE 4, the drive applied to cores 12A, 12B, and 12C is toward the clear state of these cores. Since they are already in their clear state, there is no effect on these cores. The drive applied to cores 11A, 11B, 13A, and 13B is toward their set states. However, since the drive by the phase-4 clock-pulse does not exceed the required threshold value of these cores, these cores remain substantially unaffected in their clear state.

It should be appreciated that where there is a large number of arrays, there can be a simultaneous transfer of data from a first array to a second array, a third to a fourth array, a fifth to a sixth array, etc., in response to clock pulses 1 and 2. Also, in response to the application of phase-3 and phase-4 clock-pulses, there can be a simultaneous transfer of information from a second to a third array, from a fourth to a fifth array, from a sixth to a seventh array, etc.

Figures 5, 6:
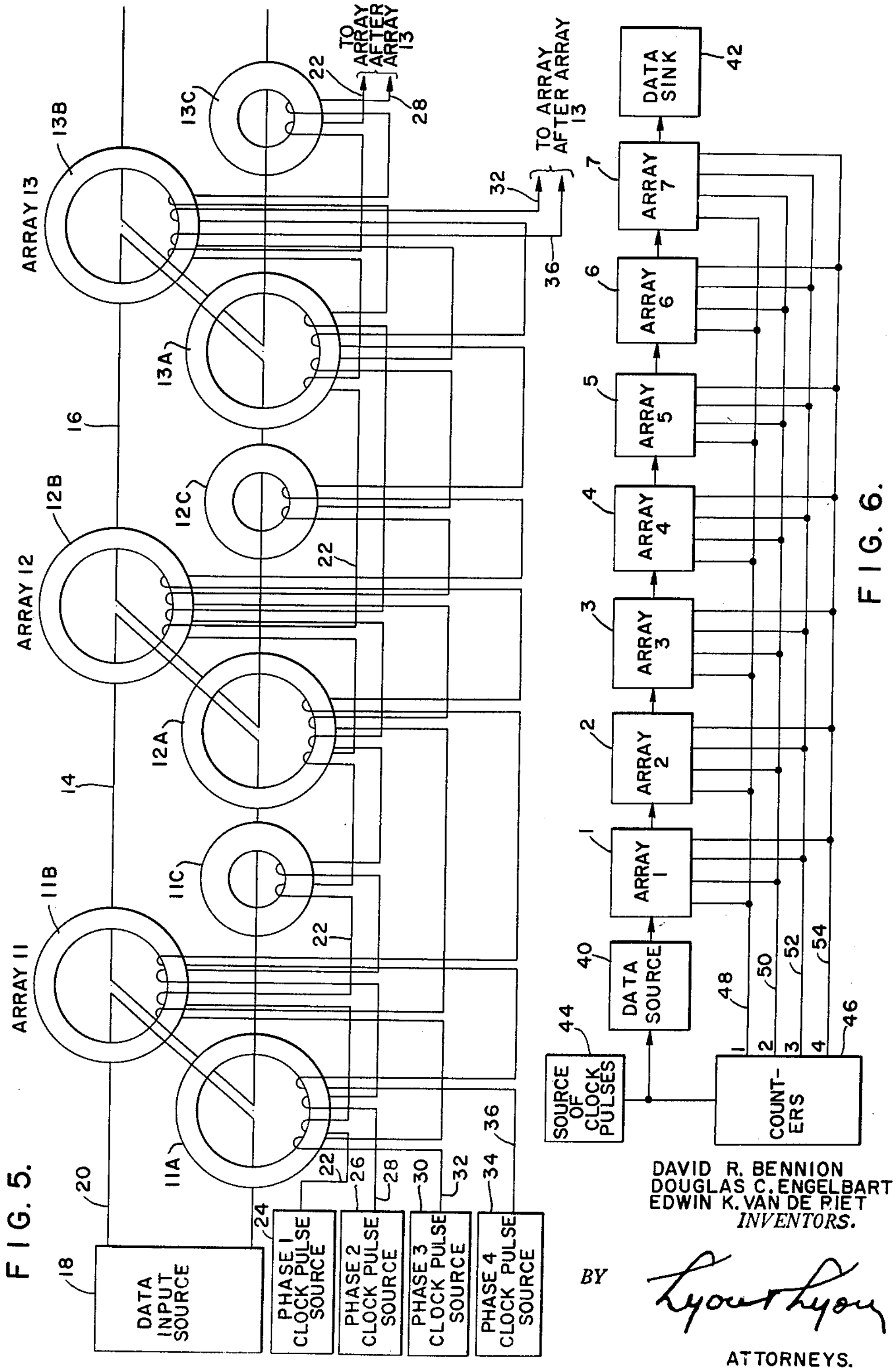
FIGURE 5 is a circuit diagram of the embodiment of the invention and incorporates all the windings shown in FIGURES 1 through 4.
FIGURE 6 is a block diagram illustrating how the principles of the invention may be utilized for improving the operation of a register.

Reference is now made to FIGURE 5, which is a circuit diagram of an embodiment of the invention. In FIGURE 5 there is combined all the structure of the invention which is separately shown in FIGURES 1 through 4. Since the structures are identical, they bear the identical reference numbers which have been employed in FIGURES 1 through 4. In view of the preceding extensive explanation of the operation of the embodiment of the invention, and since no difference in such explanation exists as far as FIGURE 5 is concerned, no description of the operation thereof will be given. It is believed that the operation of FIGURE 5 is clear from the foregoing.

FIGURE 6 is a block diagram of a seven-array register, shown for the purpose of illustrating the pattern of drive-winding connections to a plurality of arrays. The sequence of arrays bear the designations 1 through 7. The data sink 42 receives the output of the register. A source of clock pulses 44 applies its output to a counter 46 and to the data source to synchronize any output to array 1. The counter is a four-state counter, and thus its output will be four pulses in sequence. The four counter outputs are respectively applied to a first drive winding 48, a second drive winding 50, a third drive winding 52, and a fourth drive winding 54.

The first drive winding 48 is coupled to all the cores in array 1, the input and main cores in array 2, all the cores in array 3, the input and main cores in array 4, and all the cores in array 5, input and main cores in array 6, and all the cores in array 7. The second drive winding 50 is coupled to all the cores in array 1, the input and main cores in array 2, all the cores in array 3, the input and main cores in array 4, all the cores in array 5, the input and main cores in array 6, and all the cores in array 7. The third drive winding 52 is coupled to the input and main cores in array 1, all the cores in array 2, the input and main cores in array 3, all the cores in array 4, the input and main cores in array 5, all the cores in array 6, and the input and main cores in array 7. The fourth drive winding 54 is coupled to the input and main cores in array 1, all the cores in array 2, the input and main cores in array 3, all the cores in array 4, the input and main cores in array 5, all the cores in array 6, and the input and main cores in array 7. It is believed that the sense of couplings of the drive windings to the cores in the arrays will be clear from the preceding figures of the drawings and their description, if it is borne in mind that winding 48 corresponds to winding 22, winding 50 corresponds to winding 28, winding 52 corresponds to winding 32, and winding 54 corresponds to winding 36.

Figure 7:
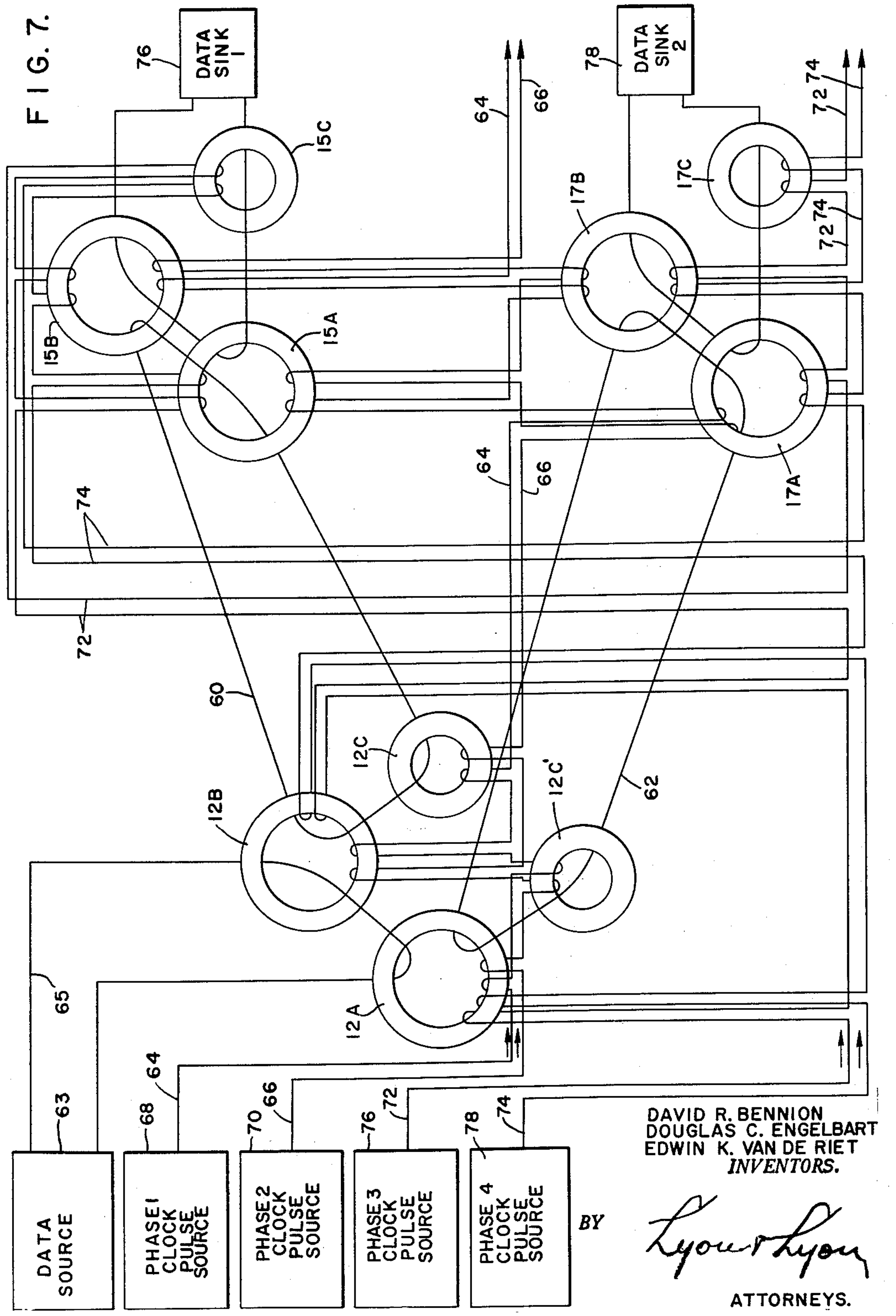
FIGURE 7 illustrates the use of the invention for transferring from one array to two others.

It should be noted that the use of flux doubling is not limited to increasing the gain in a shift register structure. It may be used in any type of circuit where information is transferred from one array to another. It also can be used to transfer from one array into two others. In such a case, the main core 12B in array 12, for example, would be coupled to one array, and input core 12A in array 12 would be coupled to another array. A circuit exemplifying this type of coupling is shown in FIGURE 7. A transfer winding 60 couples core 12B to cores 12C, 15A, and 15B. The sense of the coupling of the winding 60 to these cores is the same as is employed for coupling a main core and an output core in an array to an input core and a main core of a succeeding array, illustrated in FIGURES 1 through 5. Another transfer winding 62 couples cores 12A, 12C′, 17A, and 17B. The sense of the coupling of the transfer winding 62 is the same as is employed for coupling the main core and output core of an array to the input and main cores of a succeeding array. At this time, of course, a core 12A is considered as the main core and another core, 12C′, is provided as the output core. The advancing windings are duplicated for each one of the arrays to which a transfer is to be made. These are shown as windings 64 and 66, respectively being driven from a phase-1 clock-pulse source 68 and a phase-2 clock-pulse source 70, and advancing windings 72 and 74, respectively, being driven from the phase-3 and phase-4 clock-pulse sources 76, 78. These advancing windings, as far as the sense of the couplings to the various cores in each of the arrays following the branching array 12 is concerned, use the identical principles as exemplified in FIGURES 1 through 5 of the drawings. Following drive winding 64 through the cores and assuming that drive current flows in the direction represented by the arrows on the drawing, then a phase-1 clock pulse tends to drive core 12A toward its set state, core 12C′ to its clear state, core 12B toward its set state, core 12C to its clear state, core 17A toward its clear state, core 15A toward its clear state, core 17B toward its set state, and core 15B toward its set state.

Using the same current-flow direction for drive winding 66, the phase-2 drive-current pulse tends to drive core 12A to its clear state, core 12C′ to its clear state, cores 12B and 12C to their clear states, cores 17A and 15A toward their set states, and cores 17B and 15B toward their set states.

Using the same current-flow direction for drive winding 72, the phase-3 drive-current pulse tends to drive core 12A to its clear state, core 12B toward its set state, cores 15A, 15B toward their set states, core 15C to its clear state, cores 17A and 17B toward their set states, and core 17C to their clear state.

Using the same current-flow convention as above, then the fourth clock pulse tends to drive core 12A toward its set state, core 12B toward its set state, cores 15A, 15B, 15C to their clear states, and cores 17A, 17B, and 17C to their clear states.

Data source 63 provides input to array 12 over winding 65. The outputs from arrays 15 and 17 are respectively received by data sinks 76, 78. The losses involved in the transfer from the one array 12 to two other arrays are made up by the flux-doubling operation in the succeeding arrays. The clear drive of cores 12C and 12C′ on the occurrence of the phase-1 clock pulse transfers stored data in the manner described in connection with FIGURE 1 of the drawings. The operation of the following two arrays is in parallel and has already been explained in connection with FIGURES 2 through 4 herein.

There has accordingly been shown and described herein a novel and useful arrangement for effectuating a transfer between magnetic cores which increases the flux linkages available for such successive transfers, thereby simplifying the problem of making shift registers with stable operation.

We claim:

1. An improved magnetic-core register comprising a plurality of magnetic-core arrays each including an input core, a main core and an output core, each core having two stable states of magnetic remanence, means for transferring the state of remanence of the three cores in one array to the three cores in a succeeding array including a transfer winding coupled to the main core and input core in said one array with one sense, being coupled to the output core in said one array in the opposite sense, being coupled to the input core in a succeeding array in said one sense, and being coupled to the main core in said succeeding array in said opposite sense.

2. An improved magnetic-core register comprising a plurality of magnetic-core arrays each including an input core, a main core and an output core, said cores each having two stable states of magnetic remanence respectively called the clear state and the set state, said input and main cores requiring the application of substantially the same magnetomotive forces to be driven from one to the other state of magnetic remanence, said output cores requiring the application of a lower magnetomotive force than said input and main cores to be driven from one to the other state of magnetic remanence, means for transferring the state of remanence of the three cores in one array to the three cores in a succeeding array including a transfer winding coupled to the main core and input core in said one array with one sense, being coupled to the output core in said one array in the opposite sense, being coupled to the input core in an succeeding array in said one sense, and being coupled to the main core in said succeeding array in said opposite sense.

3. An improved magnetic-core register as recited in claim 2 wherein said means for transferring the state of remanence of the three cores in one array to the three cores in a succeeding array includes a first drive-winding means coupled to the input, main and output cores of said one array and to the input and main core of a succeeding array for driving said one array input and main cores toward their set states, said one array output core to its clear state, said succeeding array input core toward its clear state and for driving said succeeding array main core toward its set state, and a second drive-winding means for driving all the cores in said one array to their clear states, and for driving said input and main cores of said succeeding array toward their set states.

4. An improved magnetic-core register comprising a plurality of magnetic-core arrays alternate ones of which are called odd arrays and remaining ones of which are called even arrays, each array including an input core, a main core and an output core, said cores each having two stable states of magnetic remanence respectively called the clear state and the set state, said input and main cores requiring the application of substantially the same magnetomotive forces to be driven from one to the other state of magnetic remanence, said output cores requiring the application of a lower magnetomotive force than said input and main cores to be driven from one to the other state of magnetic remanence, a plurality of transfer windings, each transfer winding coupling the cores of one array to the cores of a succeeding array, each said transfer winding being coupled to the main core and input core in one array with one sense, being coupled to the output core in said one array in the opposite sense, being coupled to the input core in a succeeding array in said one sense, and being coupled to the main core in said succeeding array in said opposite sense, first means for driving the input and main cores of each odd array toward their set states for driving the output core of said one array to its clear state, for driving the input core of each even array toward its clear state and for driving the main core of each even array toward its set state, second means for driving the input, main and output cores of each odd array to their clear states, for driving the input core of each even array towards its set state, and for driving the main core of each even array towards its clear state, third means for driving the input and main cores of each even array toward their set states, for driving the output core of each even array to its clear state, for driving the input core of each odd array towards its clear state, and for driving the main core of each odd array toward its set state, and fourth means for driving the main, input and output cores of each even array toward their clear states, for driving the input core of each odd array toward its set state, and for driving the main core of each odd array toward its set state.

5. An improved magnetic-core register comprising a plurality of mangetic-core arrays alternate ones of which are called odd arrays and remaining ones of which are called even arrays, each array including an input core, a main core and an output core, said cores each having two stable states of magnetic remanence respectively called the clear and set state, said input and main cores requiring the application of substantially the same magnetomotive forces to be driven from one to the other state of magnetic remanence, said output cores requiring the application of a lower magnetomotive force than said input and main cores to be driven from one to the other state of magnetic remanence, a plurality of transfer windings, each transfer winding coupling the cores of one array to the cores of a succeeding array, each said transfer winding being coupled to the main core and the input core in said one array with one sense, to the output core in said one array in the opposite sense, to the input core in a succeeding array in said one sense, and to the main core in said succeeding array in said opposite sense, first drive-winding means coupled to the input and main cores of each odd array for driving it to its clear state, coupled to the input core of each even array for driving it toward its clear state, and coupled to the main core of each even array for driving it toward its set state, second drive-winding means coupled to the input, main and output cores of each add array for driving these cores toward their clear states, coupled to the input core of each even array to drive it toward its set state, and coupled to the main core of each even array to drive it toward its set state, third drive-winding means coupled to the input and main cores of each even array for driving them toward their set states, coupled to the output core of each even array for driving it to its clear state, coupled to the input core of each odd array for driving it toward its clear state, and coupled to the main core of each odd array for driving it toward its set state, and a fourth drive-winding means coupled to the main, input and output cores of each even array for driving these cores toward their clear states, coupled to the input core of each odd array to drive it toward its set state and coupled to the main core of each odd array to drive it toward its set state.

6. An improved magnetic-core register comprising a plurality of magnetic-core arrays each including an input core, a main core and an output core, said cores each having two stable states of magnetic remanence respectively called the clear state and the set state, said input and main cores requiring the application of substantially the same magnetomotive forces to be driven from one to the other state of magnetic remanence, said output cores requiring the application of a lower magnetomotive force than said input and main cores to be driven from one to the other state of magnetic remanence, means for transferring the state of remanence of the three cores in one array to three cores in two succeeding arrays including a first closed transfer winding coupled to the main core in said one array with one sense, being coupled to the output core in said one array in the opposite sense, being coupled to the input core in one of said two succeeding arrays in said one sense, being coupled to the main core in said one of said two succeeding arrays in said opposite sense, an additional output core, and a second closed transfer winding, an additional output core, and a second closed transfer winding, said second transfer winding being coupled to the input core in said one array in one sense, being coupled to said additional output core in said opposite sense, being coupled to the input core of the other of said two succeeding arrays in said one sense, and being coupled to the main core of said other of said two succeeding arrays in said opposite sense.

7. An improved magnetic-core register as recited in claim 6 wherein said means for transferring the state of remanence of the three cores in one array to three cores in two succeeding arrays includes, first, second, and third drive windings, said first drive winding being coupled to said one array input and main cores in one sense and output core and additional output core in an opposite sense, being coupled to the input cores of said succeeding arrays in said opposite sense and to the main cores of said succeeding arrays in an opposite sense, said second drive winding being coupled to all said cores in said one array and said additional output core in one sense, being coupled to the input cores of both said succeeding arrays in said opposite sense and to the main cores of both said succeeding arrays in said one sense, said third drive winding being coupled to said one array input core to said one sense, to said one array main core in said opposite sense, to the input and main cores of both said succeeding arrays in said opposite sense and to the output cores of both said succeeding arrays in said one sense, and said fourth drive winding being coupled to the input core of said one array in said opposite sense, to the main core of said one array in said one sense, and to all the cores of both said succeeding arrays in said one sense.

No references cited.